(12) United States Patent
Sheldon

(10) Patent No.: US 7,645,039 B2
(45) Date of Patent: Jan. 12, 2010

(54) EYEWEAR HAVING INTERCHANGEABLE LENSES/TEMPLES

(76) Inventor: Brent Sheldon, 72 Sherbrooke West, Suite 3, Montreal, Quebec (CA) H2X 1X3

( * ) Notice: Subject to any disclaimer, the term of this patent is extended or adjusted under 35 U.S.C. 154(b) by 129 days.

(21) Appl. No.: 11/782,284

(22) Filed: Jul. 24, 2007

(65) Prior Publication Data

US 2009/0027616 A1    Jan. 29, 2009

(51) Int. Cl.
*G02C 1/02* (2006.01)

(52) U.S. Cl. ................. 351/110; 351/121; 351/140

(58) Field of Classification Search ............ 351/41, 351/83–86, 110, 119, 121, 156, 157, 140; 2/452

See application file for complete search history.

(56) References Cited

U.S. PATENT DOCUMENTS 7,261,410 B1 * 8/2007 Chen ..................... 351/110

* cited by examiner

*Primary Examiner*—Huy K Mai
(74) *Attorney, Agent, or Firm*—Daphne L. Maravei; Blake, Cassels & Graydon LLP

(57) ABSTRACT

An eyewear is provided having an interchangeable lens or temple portion. The eyewear comprises an interchangeable lens portion comprising a lens portion having an upper and a lower edge, and a left and a right lens region extending sidewardly each having a distal end; a pair of connecting members, each having a proximate end and a distal end and a hollow receiving area therein beginning at said proximate end and running into said connecting member; said distal end of said lens regions being shaped to fit within said proximate end of said connecting members wherein, said lens regions are releasably accepted and held within said hollow receiving area of said connecting members; and wherein said connecting members are releasable from said lens portion by applying a torsional force on one of said connecting member and said lens portion.

14 Claims, 4 Drawing Sheets

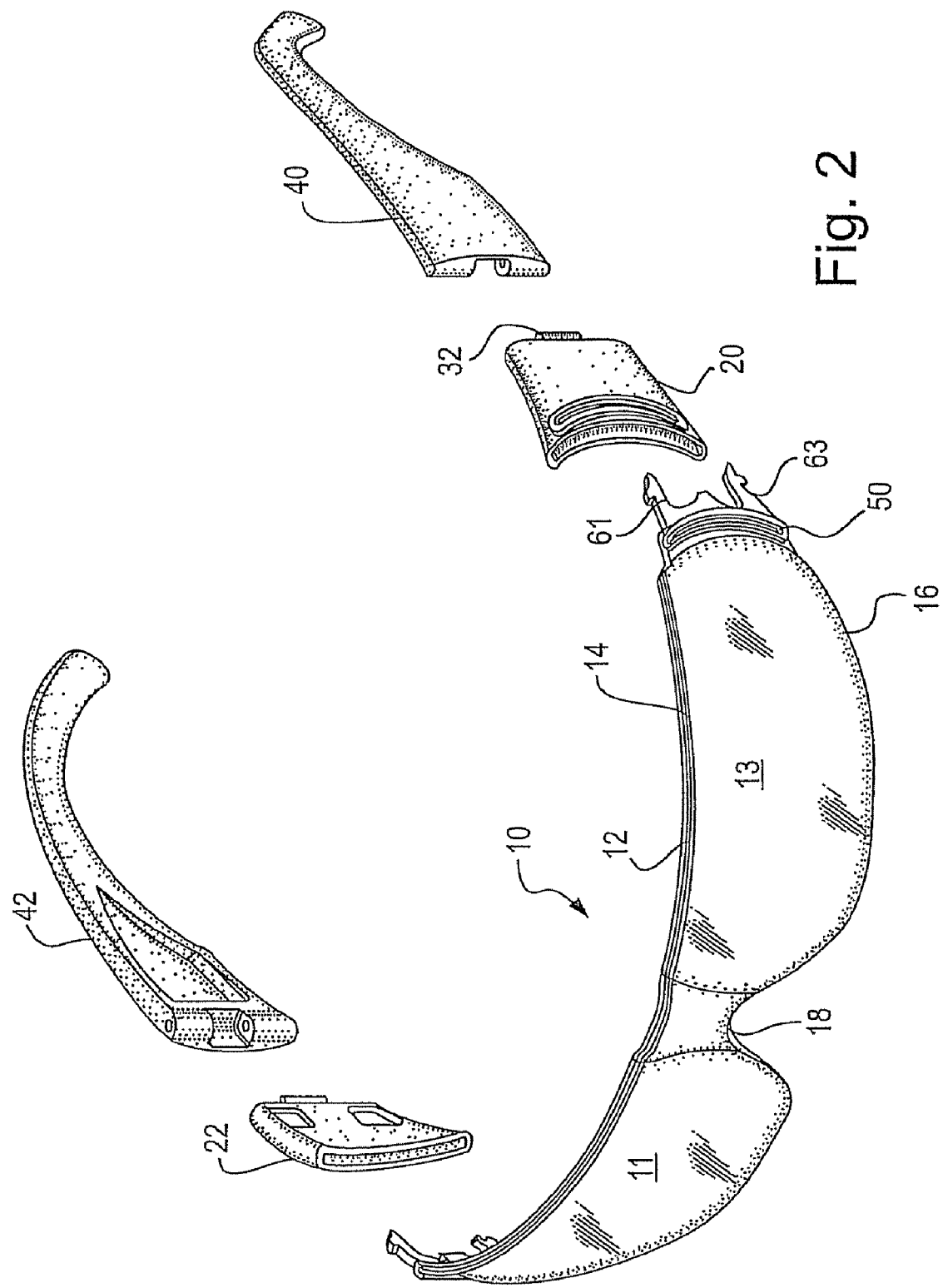

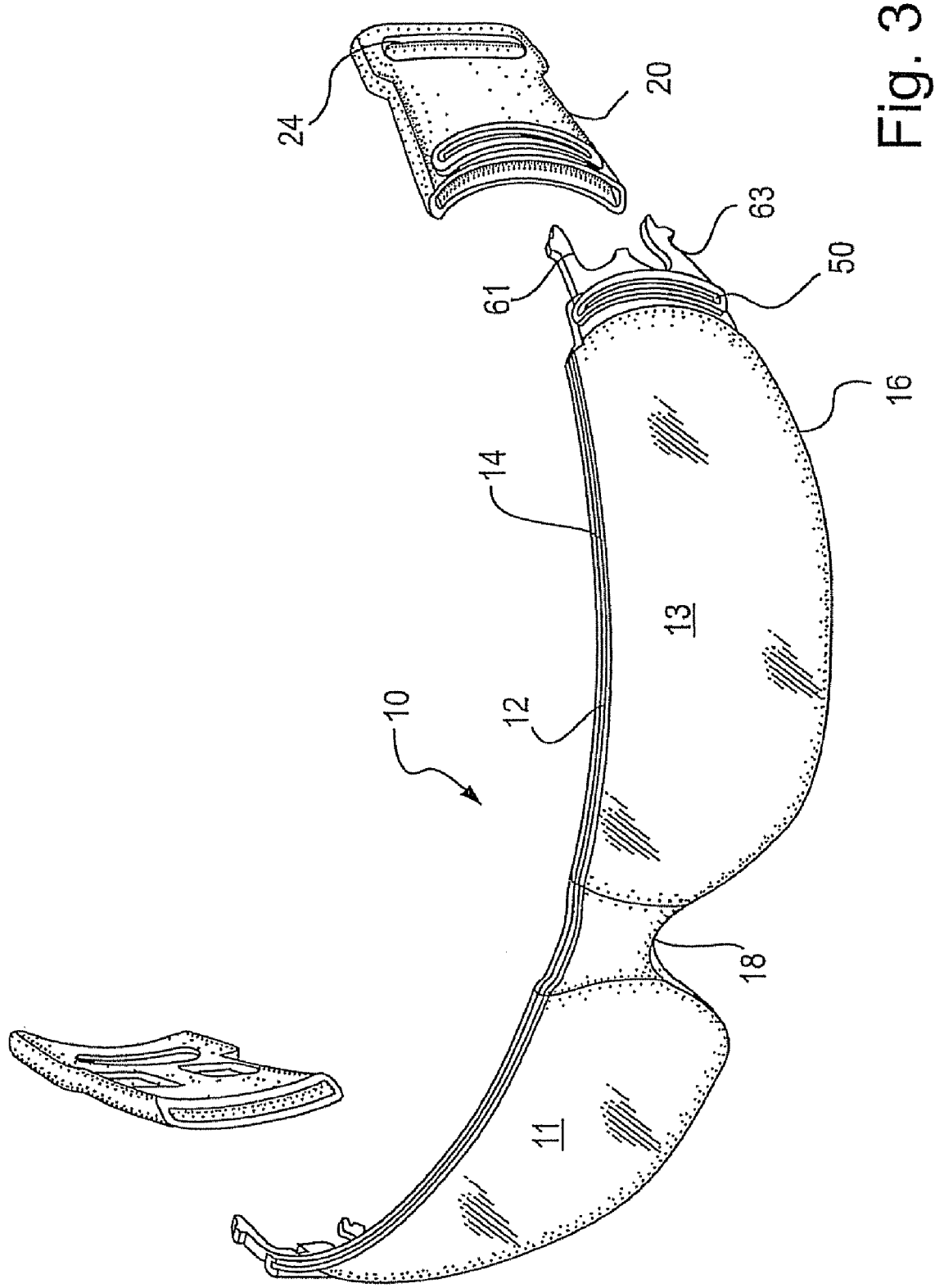

EYEWEAR HAVING INTERCHANGEABLE LENSES/TEMPLES

BACKGROUND OF THE INVENTION

Eyeglasses are worn during a wide range of activities. They can be prescriptive to correct visual defects, tinted to reduce eye fatigue from the sun, or provide safety when worn during hazardous activities where eye injury is at risk.

Safety glasses usually enclose or protect the eye area in order to prevent foreign objects or dangerous chemicals from striking the eyes. They are used in most industrial applications, including manufacturing facilities and chemistry laboratories. Protective eyewear is also used during various sporting activities, such as skiing or racquet sports. Safety glasses are also used by people performing various tasks around the home, including operating power tools in order to prevent flying particles from damaging the eyes.

Many types of safety glasses are available as prescription glasses for those with vision problems or can be tinted if being used outdoors or in an environment where sudden bursts of light, for instance welding, may be an issue.

There is growing awareness in manufacturing facilities that eye protection is required; both for employees and for guests visiting such facilities. This requires that safety eyewear be readily available and easily adaptable for each user. Some lens become scratched, pitted, broken, bent or not fit for use. Scratches impair vision and can weaken lenses. Other times, a different tint or grade of lens is required. During such times, it is desirable to be able to easily replace the damaged or inappropriate lens with a fresh lens, while conserving the temple portion. Such interchangeability would also be useful with conventional prescription eyewear.

Interchangeability is also desirable if a user requires a different type of temple or arm portion. Alternatively, in some cases an elasticized or adjustable headstrap is desired for use during sporting activities, in lieu of temples.

Furthermore, conventional eyewear and safety glasses have temples, the length of which is fixed. If the length of the temple is not proper, the wearer may feel discomfort when wearing the eyewear. Furthermore, the improper length can lead to the eyewear being improperly seated on the user's face. It would be desirable to be able to adjust the eyewear to suit different users, easily and inexpensively.

Many of the prior art safety eyewear have had several shortcomings in that they are generally not flexible and have required the use and removal of fasteners which may require tools, when replacing lenses or making sizing adjustments. Other systems require substantial deformation of the lens or frame, making insertion and removal difficult.

The present invention is directed to eyewear having lenses or temple portions which are easily interchangeable and inexpensive to manufacture, yet easy to use and sturdy enough for use in industrial or sporting applications. The present eyewear can also provide for temple lengths that can be adjusted according to the user's needs. A connecting system is desired in the art that would enable such interchangeability.

The present invention is directed to eyewear that is easily assembled on manufacture and therefore leads to lower overall manufacturing costs.

The present invention is not limited to safety eyewear and can be applied to all eyewear that requires simple and inexpensive interchangeability of lenses or temples.

SUMMARY OF THE INVENTION

The present invention provides eyewear having interchangeable lenses wherein said lenses can be easily replaced using the torsional force of the user. The eyewear of the present invention overcomes the problems associated with a complicated connecting system for connecting temples or headstraps to the lens portion of eyewear.

In accordance with one aspect of the present invention there is provided an eyewear having an interchangeable lens portion comprising a lens portion having an upper and a lower edge, and a left and a right lens region extending sidewardly each having a distal end; a pair of connecting members, each having a proximate end and a distal end and a hollow receiving area therein beginning at said proximate end and running into said connecting member; said distal end of said lens regions being shaped to fit within said proximate end of said connecting members wherein, said lens regions are releasably accepted and held within said hollow receiving area of said connecting members; and wherein said connecting members are releasable from said lens portion by applying a torsional force on one of said connecting member and said lens portion.

In accordance with a further aspect of the present invention, there is provided an eyewear having an interchangeable lens portion comprising a lens portion having an upper edge, a lower edge, and a left and a right distal lens region; each of said distal lens regions of said lens portion having a connecting member receiving end and a hollow receiving area beginning at said receiving end and running into said lens portion; a pair of connecting members having a proximate end and a distal end, said proximate end being shaped to fit within said hollow receiving area and being releasably accepted and held within said hollow receiving area of said lens portion; and wherein said connecting members are releasable from said lens portion by applying a torsional force on one of said connecting member and said lens portion.

According to other embodiments, the length of the temple portion can be adjusted accordingly to needs of the user. The invention can be used with a unitary lens construction or may be adapted to be used with a frame construction.

BRIEF DESCRIPTION OF THE DRAWINGS

FIG. 2 is an exploded perspective view of the present invention in a disassembled state, adapted to be connected to a temple portion;

FIG. 3 is an exploded perspective view of the present invention in a disassembled state adapted to be connected to a headstrap;

DETAILED DESCRIPTION OF THE PRESENT INVENTION

Figure 1:
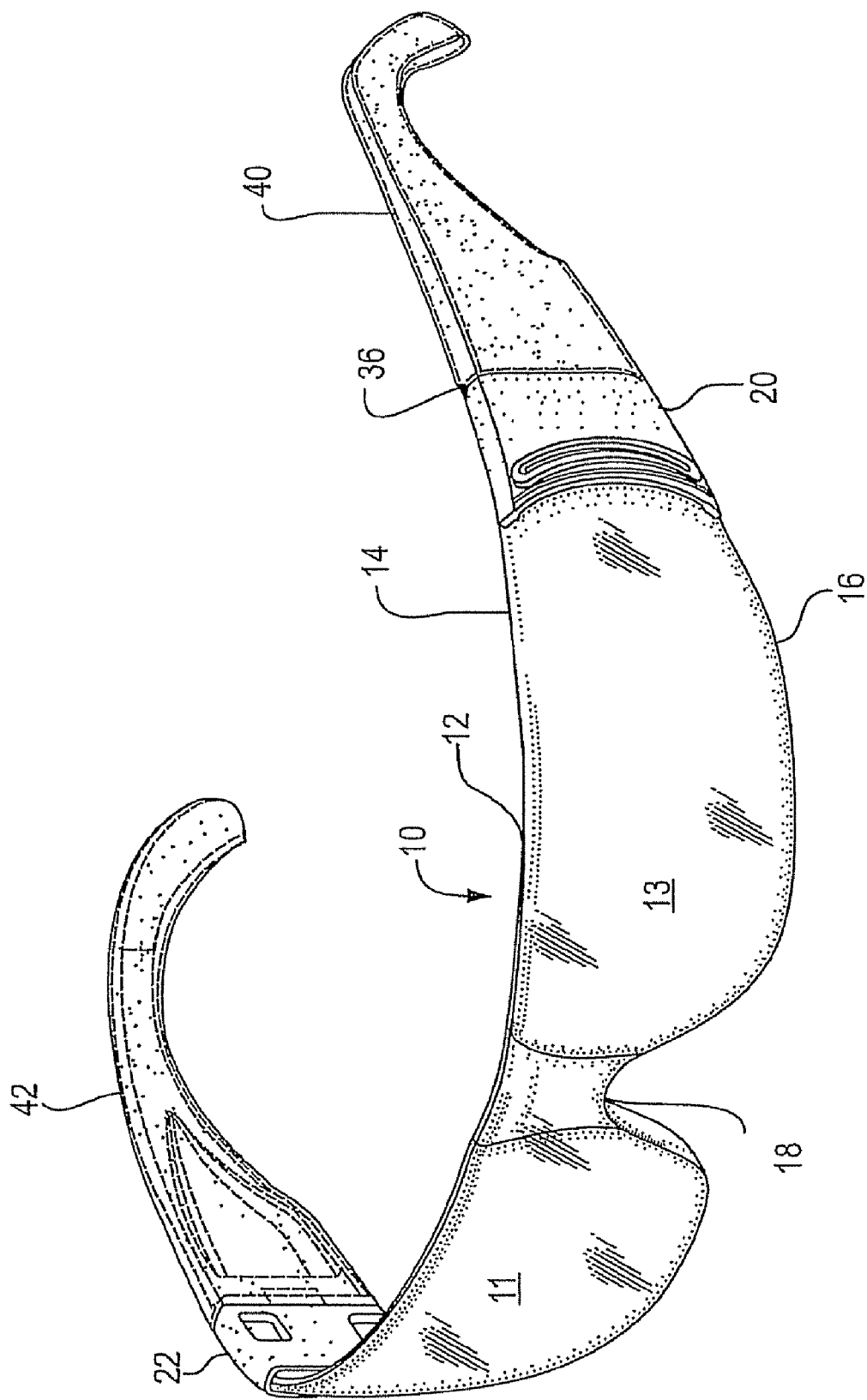
FIG. 1 is a left front perspective view of the present invention showing interchangeable temples mounted thereon.

Referring to the FIGS., and in particular FIG. 1, an eyewear 10 is shown having a lens portion 12 defined by a top edge 14 and a bottom edge 16, and two temples 40 and 42. The lens portion 12 is also defined by a left lens region 11 and a right lens region 13, and a bridge portion 18. Viewing the eyewear 10 from the front, each lens region has a distal end near the temple and a proximate end near the nose bridge 18. In the embodiment shown in FIG. 1, the lens portion is of unitary construction. The eyewear may also employ a standard frame construction having a lens portion receiving portion.

Referring to FIG. 1, an embodiment of the eyewear 10 is shown attached to temples 40 and 42. As shown in FIG. 1, a first connecting member 20 connects the distal end of lens region 13 to temple 40 and a second connecting member 22 connects temple 42 to a distal end of lens region 11. Connecting members 20 and 22 have a proximate end near the lens portion and a distal end near the temples 40 and 42. Hereinafter, lens region 13, connecting member 20 and temple 40 will be described along with the manner of connection, but it will be understood that lens region 11, temple 42 and connecting member 22 have a similar construction.

In one embodiment, temple 40 is attached to the distal end of connecting member 20 via a hinge connection 36. The temple 40 may be attached to connecting member 20 in the conventional manner, such as with a rivet, or a snap-on interfit. In the embodiment, shown in FIG. 1, connecting member 20 and temple 40 are connected with a standard hinge connection 36 using a screw.

As shown in FIGS. 1 and 2, connecting member 20 connects temple 40 to lens region 13. Connecting member 20 also serves to add peripheral protection to a user's eyes given its uniform construction and placement along the eyewear. The distal end of connecting member 20 includes a hinge member 32 which is inserted into temple 40.

In FIG. 2, the connecting member 20 and temples 40 and 42 are shown unassembled from the lens portion 12. The distal ends of lens regions 11 and 13 extend sidewardly. In the embodiment shown in FIG. 2, said distal lens regions may also taper slightly. The distal ends of said lens regions comprise at least one protrusion 50. In the embodiment shown in FIG. 2, said protrusion 50 extends the entire height of the lens portion 12 from the top edge 14 to the bottom edge 16 of said lens portion 12. In an alternate embodiment, said protrusion 50 may span only a portion of the height of the lens portion 12 and may also take on any suitable configuration for instance, a raised rounded or rectangular portion, or a raised protrusion of any shape or size that is disposed horizontally or vertically along the distal ends of said lens regions. In a further embodiment not shown, said lens regions may comprise a plurality of protrusions 50 disposed adjacent one another along the distal ends of said lens regions 11 and 13.

As also seen in FIG. 2, in a further embodiment, adjacent to said at least one protrusion 50, the distal end of said lens regions 11 and 13 may terminate in one or a plurality of guiding members 61 and 63 which extend axially from said top edge 14 and bottom edge 16 of said eyewear 10. Guiding members may also extend axially from any point between the top edge 14 and bottom edge 16. Corresponding guiding members project on the other side of the lens region 11. Guiding members 61 and 63 are projections preferably formed integrally with the lens portion 12, and of the same material or in the case of a lens housed in a frame, can be formed integrally with the frame. Guiding members 61 and 63 may also be formed separately from the lens portion or frame and may be attached by suitable fasteners or welded to the lens portion or frame.

Referring to FIG. 3, a further embodiment of the present invention is shown wherein said eyewear 10 is adapted to be attached to a headstrap. In particular, connecting member 20 is adapted to be connected to a headstrap (not shown). In one embodiment, connecting member 20 is shown with a loophole 24 disposed at its distal end. The headstrap can be looped through loophole 24 and stitched into place or maintained in the loophole 24 by way of a clasp or a buckle, as is known in the art. A headstrap may also be attached to connecting member 20 by any suitable means such as a velcro panel disposed between the connecting member and the headstrap or any other suitable fastener or adhesive.

Figure 4C:
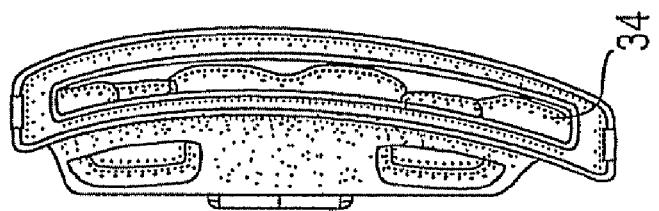
FIG. 4C is a front view of the connecting member showing the inside thereof.
Figure 4B:
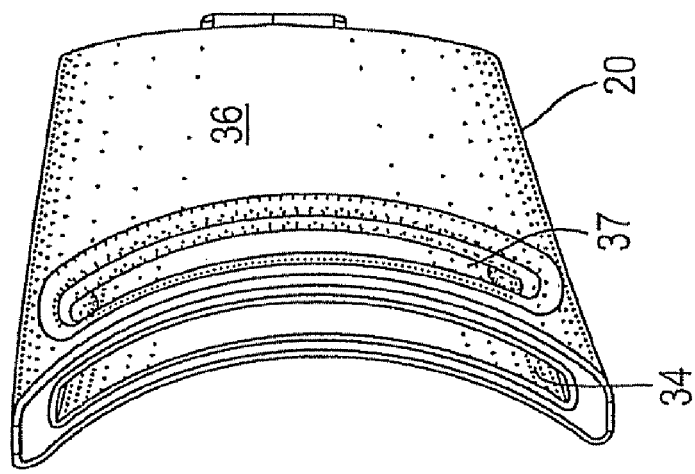
FIG. 4B is a right perspective view of the connecting member.
Figure 4A:
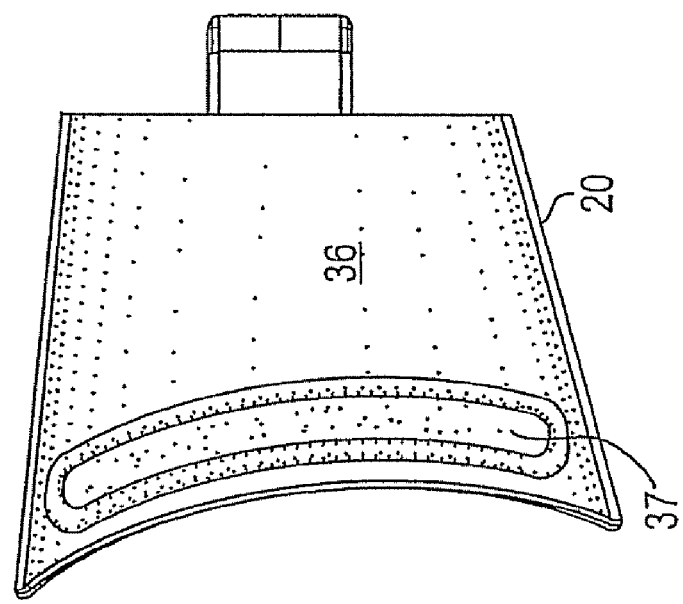
FIG. 4A is a side view of the connecting member.

As shown in FIGS. 4a, 4b and 4c, connecting member 20 for connection with a standard temple is shown in isolation. The aspects shown and described in FIGS. 4a, 4b and 4c would not differ for a connecting member adapted for use with a headstrap. Connecting member 20 has a lens receiving opening 34 on its proximate end, an outer surface 36 and a hollow receiving area disposed therein beginning at said lens receiving opening 34 and running into said connecting member 20. Said connecting member 20 has a recess area 37 disposed in said connecting member contiguous with said hollow receiving area. Recess area 37 may be of any suitable configuration for engaging with protrusion 50 and that will allow easy insertion and removal of the distal lens region of the lens portion 12. In the embodiment shown in the FIGS, said recess area 37 is visible through the outer surface 36 and is shown in the form of an opening, however it may also be in the form of a notch or an indent disposed on the inside of the connecting member 20 and need not be visible through the outer surface 36. Recess area 37 corresponds in orientation with protrusion 50 and is approximately equal or slightly greater in size than protrusion 50. Recess area 37 closely fits and accepts protrusion 50 in a snap lock interfit.

Lens receiving opening 34 runs from the proximate end of said connecting member 20 to a point within the connecting member 20. The hollow receiving area running from said lens receiving opening 34 further comprises a complimentary shaped area in the form of a series of grooves that conform to the shape of guiding members 61 and 63. In this manner, guiding members slide and fit into the grooves to facilitate the connection process and assist in aligning the lens portion 12 into the connecting member 20 and provide a more secure connection.

In another embodiment not shown, said lens region 13 may comprise a plurality of protrusions 50 disposed adjacent to one another, thereby permitting a user to adjust the length of a temple by forcing said recess area 37 of connecting member 20 onto an appropriate protrusion 50 of his/her choice. If a protrusion is selected which is more proximate to the bridge 18, the resulting temple will be shorter in length over a user's ear. Said headstrap or temple portion 40 may be attached to the connecting member 20, before or after the connecting member is connected to the lens portion.

When a user desires to change the lens portion 12 or replace the temple portion 40 and 42 or headstrap, the user applies an upward or downward torsional force on the connecting member 20 while holding the lens portion 12 in place, or alternatively holding the connecting member 20 in place while applying a torsional force on the lens 12. This will release the protrusion 50 from the recess area 37 and permit the guiding members 61 and 63 to slide out of the grooves.

In an alternate embodiment of the invention not illustrated in the drawings, the configuration of the present invention may take on the reverse configuration, wherein said at least one protrusion 50 may be disposed on a proximate end of a connecting member 20. Said distal ends of said lens portions 11 and 13 have a connecting member receiving end and a hollow receiving area beginning at said connecting member receiving end. Said hollow receiving area runs into said lens portion. In a further embodiment connecting member 20 would further comprise at least one guiding member disposed on its proximate end. Temples or a headstrap may be connected to the distal ends of said connecting members in the manner described above. Said distal ends of said lens portion 12 would have a corresponding recess area contiguous with said hollow receiving area for receiving and engaging with said protrusion 50 and would be of approximately equal or slightly greater size than protrusion 50 to closely fit and accept protrusion 50. Said recess area would also be of the same orientation as protrusion 50.

Lens portion 12 may be constructed from an optical plastic as is conventionally used in the art, such as thermoplastic or polycarbonate. Temples 40 and 42 and connecting members 20 and 22 are also made of a suitable material that can elastically deform such as thermoplastic resins or thermoplastic elastomers.

The present invention is not limited by the figures set forth herein or the embodiments specifically disclosed above. It should be understood that the scope of the invention includes all modifications, variations and equivalents which are all within the scope of the attached claims.

What is claimed is:

1. An eyewear having an interchangeable lens portion comprising:
   (a) a lens portion having an upper and a lower edge, and a left and a right lens region each having a distal end;
   (b) at least one protrusion disposed on each of said distal end of said lens regions;
   (c) a pair of connecting members, each having a proximate end and a distal end and a hollow receiving area therein beginning at said proximate end and running into said connecting member;
   (d) said distal end of said lens regions being shaped to fit within said proximate end of said connecting members wherein, said lens regions are releasably accepted and held within said hollow receiving area of said connecting members; and
   (e) wherein said connecting members are releasable from said lens portion by applying a torsional force on one of said connecting member and said lens portion.

2. Eyewear of claim 1 comprising a plurality of protrusions disposed on each of said distal ends of said lens regions.

3. Eyewear of claim 1 wherein said at least one protrusion spans the entire length between said upper and lower edge of said lens portion.

4. Eyewear of claim 1 wherein said connecting member further comprises a recess area contiguous with said hollow receiving area and disposed on an inner surface of said connecting member, wherein said recess area removably accepts said at least one protrusion in a lock interfit.

5. Eyewear of claim 4 wherein said recess area is an opening of an approximately equal or slightly greater size than said at least one protrusion.

6. Eyewear of claim 1 further comprising rearwardly extending temples, said temples pivotally attached to said distal end of said connecting members.

7. Eyewear of claim 6 wherein said temples are hingedly connected to said connecting members.

8. Eyewear of claim 1 wherein said distal end of said lens regions further comprise axially extending projections that are shaped to interfit within a complimentary shaped groove area in said connecting member.

9. Eyewear of claim 1 wherein said lens portion is of unitary construction.

10. Eyewear of claim 1 further comprising a frame having a lens portion receiving section.

11. Eyewear having an interchangeable lens portion comprising:
    (a) a lens portion having an upper edge, a lower edge, and a left and a right distal lens region;
    (b) each of said distal lens regions of said lens portion having a connecting member receiving end and a hollow receiving area beginning at said receiving end and running into said lens portion;
    (c) a pair of connecting members having a proximate end and a distal end, said proximate end being shaped to fit within said hollow receiving area and being releasably accepted and held within said hollow receiving area of said lens portion;
    (d) at least one protrusion disposed on the proximate end of each of said connecting members and
    (e) wherein said connecting members are releasable from said lens portion by applying a torsional force on one of said connecting member and said lens portion.

12. Eyewear of claim 11 further comprising rearwardly extending temples, said temples pivotally attached to said distal end of said connecting members.

13. Eyewear of claim 11 wherein said lens portion further comprises a recess area contiguous with said hollow receiving area and disposed on an inner surface of each of said distal lens region wherein said recess area removably accepts said at least one protrusion in a lock interfit.

14. Eyewear of claim 11 wherein said proximate ends of said connecting members further comprise outward extending projections that are shaped to interfit within complementary shaped grooves within said hollow receiving area of said lens portion, said projections facilitating insertion of said connecting members into said lens portion.

\* \* \* \* \*